(12) United States Patent
Chang et al.

(10) Patent No.: US 9,336,602 B1
(45) Date of Patent: May 10, 2016

(54) ESTIMATING FEATURES OF OCCLUDED OBJECTS

(71) Applicant: Rawles LLC, Wilmington, DE (US)

(72) Inventors: Samuel Henry Chang, San Jose, CA (US); Ning Yao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 524 days.

(21) Appl. No.: 13/770,327

(22) Filed: Feb. 19, 2013

(51) Int. Cl.
*G06T 7/00* (2006.01)

(52) U.S. Cl.
CPC .................................. *G06T 7/0075* (2013.01)

(58) Field of Classification Search
None
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,905,551 B1 * | 12/2014 | Worley, III | G06F 3/011 353/122 |
| 2009/0109240 A1 * | 4/2009 | Englert | G06T 19/006 345/633 |
| 2011/0249864 A1 * | 10/2011 | Venkatesan | G01B 11/2509 382/103 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Andy Rao
*Assistant Examiner* — Obafemi Sosanya
(74) *Attorney, Agent, or Firm* — Lee & Hayes, PLLC

(57) ABSTRACT

A number of images of an environment may be obtained over time. In some images, a portion of an object included in the environment may be occluded by another object in the environment. In these images, features of the occluded portion of the object may be absent. The absent features may be estimated based on features generated from previous images including the object where the occluded portion of the object was not occluded in the previous images. In some cases, the absent features may be estimated based on data associated with a reference object that corresponds to the occluded object with the reference object being included in a catalog of reference objects.

24 Claims, 9 Drawing Sheets

ESTIMATING FEATURES OF OCCLUDED OBJECTS

BACKGROUND

Modeling of an environment is often conducted with the assumption that the environment is in a static situation. For example, the modeling of a workspace including a desk, computing device, peripheral devices, phone, and the like is performed under the assumption that objects in the workspace are not moving. However, in many instances, the environment being modeled is a dynamic environment that includes moving objects. To illustrate, objects within a workspace may be moved, such as a mouse or keyboard. Additionally, as a user of the workspace interacts with the objects in the workspace, the hands and arms of the user may enter the workspace and change positions from time to time. Static models are typically inadequate to provide an accurate model of these dynamic environments. Accordingly, there is a need to improve ways of modeling dynamic environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
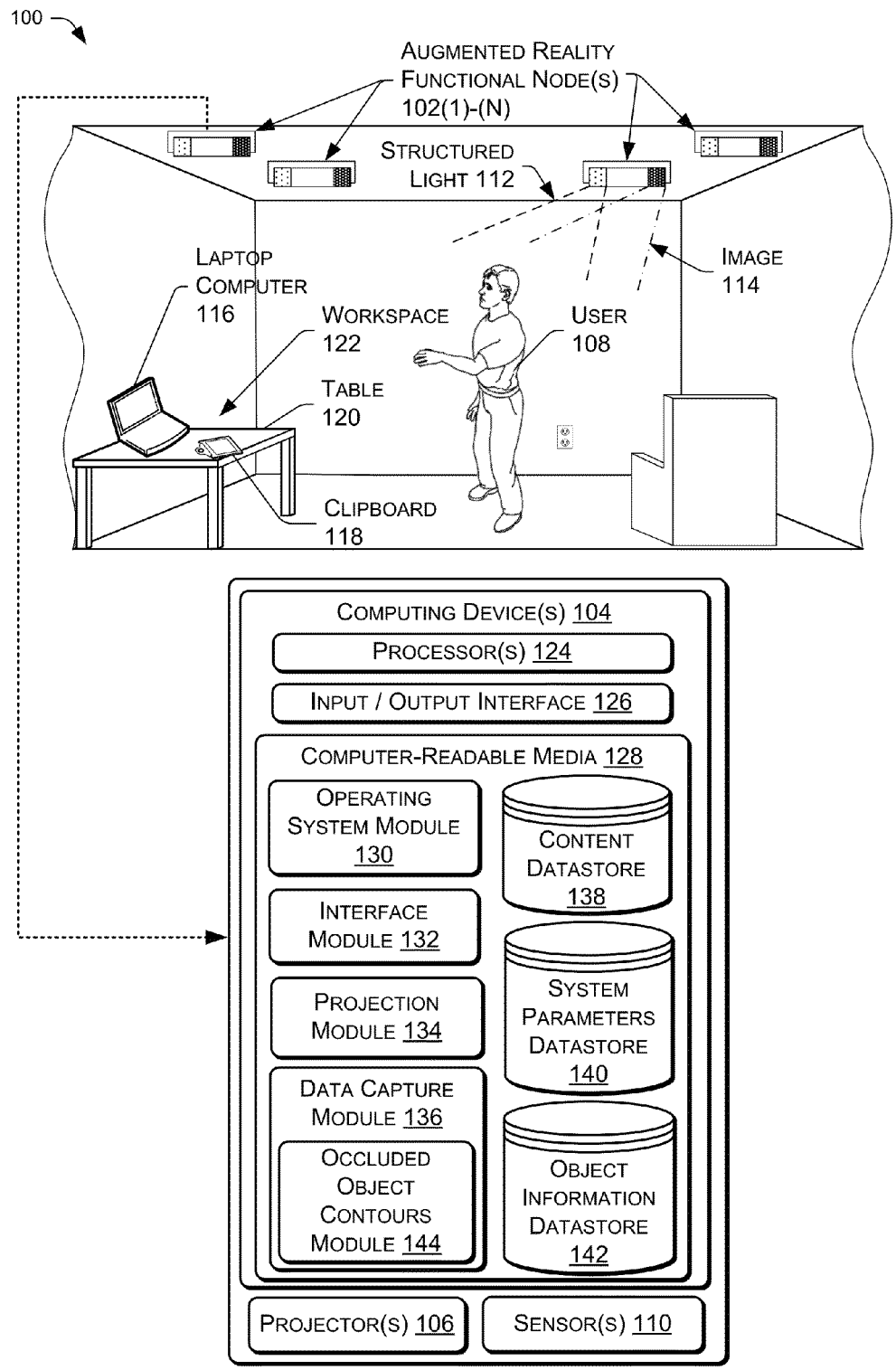
FIG. 1 illustrates an environment that includes an augmented reality functional node (ARFN) and a user that may interact with the ARFN using hand gestures.

Described herein are systems and techniques for estimating missing features of occluded objects in an environment. In some cases, the environment may include a workspace that has objects a user can utilize to perform certain tasks, such as tasks related to the user's employment. For example, the workspace may include a table, a desk, a chair, a display device (e.g., a monitor), a computing device (e.g., laptop computer, tablet computer, desktop computer), a telephone, a keyboard, a pointing device (e.g., a mouse), paper products (e.g., loose leaf paper, notebooks, sticky notepads, etc.), office supplies (e.g., pens, pencils, a stapler, etc.), wires of electronic devices in the workspace, other furniture, combinations thereof, and the like. By estimating the missing features of occluded objects included in an environment, a more accurate model of the environment can be generated. As a more accurate model of the environment is developed, the identification of interactions between objects in the environment improves and input provided by the user can be more accurately determined.

In some situations, the positions of one or more objects in the environment may overlap. In some instances, the position of a stationary object may overlap with the position of another stationary object, while in other cases the position of an object in motion may overlap with the position of a stationary object. In one example, at least a portion of a paper notepad may be resting on top of a laptop computer. In another example, the position of a hand of a user in the workspace may overlap with the positions of other objects in the workspace, such as a desk, a keyboard, a pointing device, a telephone, and so forth. Additionally, as a user moves from one position to another to reach for an object on a desk, such as a phone, the position of the hand of the user may overlap with positions of different portions of the objects in the workspace.

In some cases, when the positions of objects in an environment overlap, a feature of at least one of the objects may not be detectable. For example, a portion of one object may be blocked from a field of view of a camera or other sensor by at least a portion of another object. Thus, features of the occluded object, such as contours, colors, textures, shapes, etc., may not be detectable by the sensor. In these situations, the object with the undetectable features may be referred to herein as an "occluded object." When modeling the environment, the features of occluded objects may not be generated based solely on data gathered by sensors located in the environment at the time that the portions of the objects are occluded. Techniques described herein can be utilized to estimate the missing features of occluded objects when modeling an environment.

In an illustrative implementation, data associated with the environment is obtained over time by one or more sensors located in the environment. For example, in some cases, cameras located in the environment may capture three-dimensional (3D) images of the environment. In other cases, one or more red-green-blue (RGB) cameras may also capture images of the environment. The data obtained by the sensors may be used to generate a model of the environment. For example, data from images of the environment may be used to generate contours of objects in the environment, colors of objects in the environment, textures of objects in the environment, or a combination thereof.

When a portion of an object in the environment is occluded by another object, the occluded portion of the object may be missing and the features of the occluded portion can be estimated. In one implementation, the missing features may be estimated based on data previously acquired from the environment. For example, when a portion of an object in the environment is occluded by an object in motion, a portion of the object may be occluded at a one time, but not occluded at a previous time. Thus, the data previously obtained when the portion of the object is not occluded can be used to estimate the features of the object at a time when the portion is occluded. To illustrate, as a hand of an individual in a workspace environment moves across a desk, different portions of the desk may be occluded by the hand. In one example scenario, as the user reaches a hand from a keyboard to a phone, a different portion of the desk may be occluded. The features of the portion of the desk that is occluded when the user grasps the phone may be estimated from data captured previously when the hand is not occluding that portion of the desk, (e.g., when the hand is on the keyboard).

In some situations, the missing features of occluded objects may be estimated based on data associated with objects stored in the catalog of reference objects. For example, partial portions of an occluded object may be compared with data associated with complete objects included in a catalog of reference objects. When the partial portions of the occluded object at least match a threshold amount of the data associated with a particular reference object, the missing features of the occluded portions of the object may be estimated based on the data associated with the particular reference object. To illustrate, the position of the missing features of the occluded object may be determined and the data associated with the corresponding position of the reference object may then be used to estimate the missing features.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment 100 illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user 108 within the environment 100 may request that the ARFN 102 project a particular electronic book that the user 108 wishes to read. In response, the ARFN 102 may project the book onto a projection surface within the environment 100. In another example, the user 108 may request that the ARFN 102 project a particular movie or show that the user 108 wishes to watch. In response, the ARFN 102 may obtain the content (locally or remotely) and may project the content onto a surface in the environment 100. In yet another example, the ARFN 102 may be configured to project a user interface (UI), such as a keyboard, a slider bar, a virtual remote control to operate a television within the environment 100, a telephone keypad, or any other type of UI. In some cases, the ARFN 102 may project the UI onto a display object in the environment 100, such as a hand of the user 108.

As discussed in further detail below, the ARFN 102 may include one or more sensor(s) 110 that may obtain data from the environment 100. In some implementations, the sensors 110 may include cameras (e.g., motion and/or still cameras), audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof. In a particular implementation, the sensors 110 may include cameras that capture images of the illustrated user 108 providing input to the ARFN 102, such as by operating a projected UI, and in response, the ARFN 102 may provide feedback to the user 108 and/or may cause performance of actions corresponding to the selection by the user 108. For instance, when the ARFN 102 projects a remote control, the ARFN 102 may provide feedback to the user 108 indicating which button(s) a user is in position to select, may identify a particular selection of the user 108 (e.g., a selection to power on the television) and, in response, may operate the television according to the identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user 108 without reference to a UI projected within the environment 100.

In the illustrative example of FIG. 1, one of the ARFNs 102 within the environment 100 is shown to project structured light 112. In addition, the ARFN 102 may capture one or more images 114 within the environment 100 for the purpose of identifying distortions in the structured light 112. While FIG. 1 illustrates one ARFN 102 projecting this structured light 112 and imaging the environment 100 to identify the distortions, in some implementations, one or more other ARFNs 102 may additionally or alternatively perform these functions. In either instance, by imaging the environment 100 in this manner, the ARFNs 102 may identify gestures of the user 108 within the environment 100. Such gestures may be interpreted as instructions or commands to be implemented by the ARFNs 102.

The ARFNs 102 may also identify objects within the environment 100, such as the laptop computer 116, the clipboard 118, and the table 120. The laptop computer 116, the clipboard 118, and the table 120 may be located in a workspace 122. In some scenarios, the user 108 may interact with objects in the workspace 122 to perform particular tasks. The ARFNs 102 may capture images of the interactions of the user 108 with the objects in the environment 100. In an illustrative example, the ARFNs 102 may capture images as the user 108 composes an email using the laptop computer 116 or writes notes on the clipboard 118.

Note that certain embodiments may not involve the projection of structured light. Accordingly, it should be understood that use of structured light is but one example of various techniques that may be used in object recognition of objects in a scene.

As illustrated, the computing device 104 of the example ARFN 102 includes one or more processors 124, an input/output interface 126, and memory or computer-readable media 128. The processors 124 may be configured to execute instructions, which may be stored in the computer-readable media 128 or in other computer-readable media accessible to the processors 124.

Figure 2:
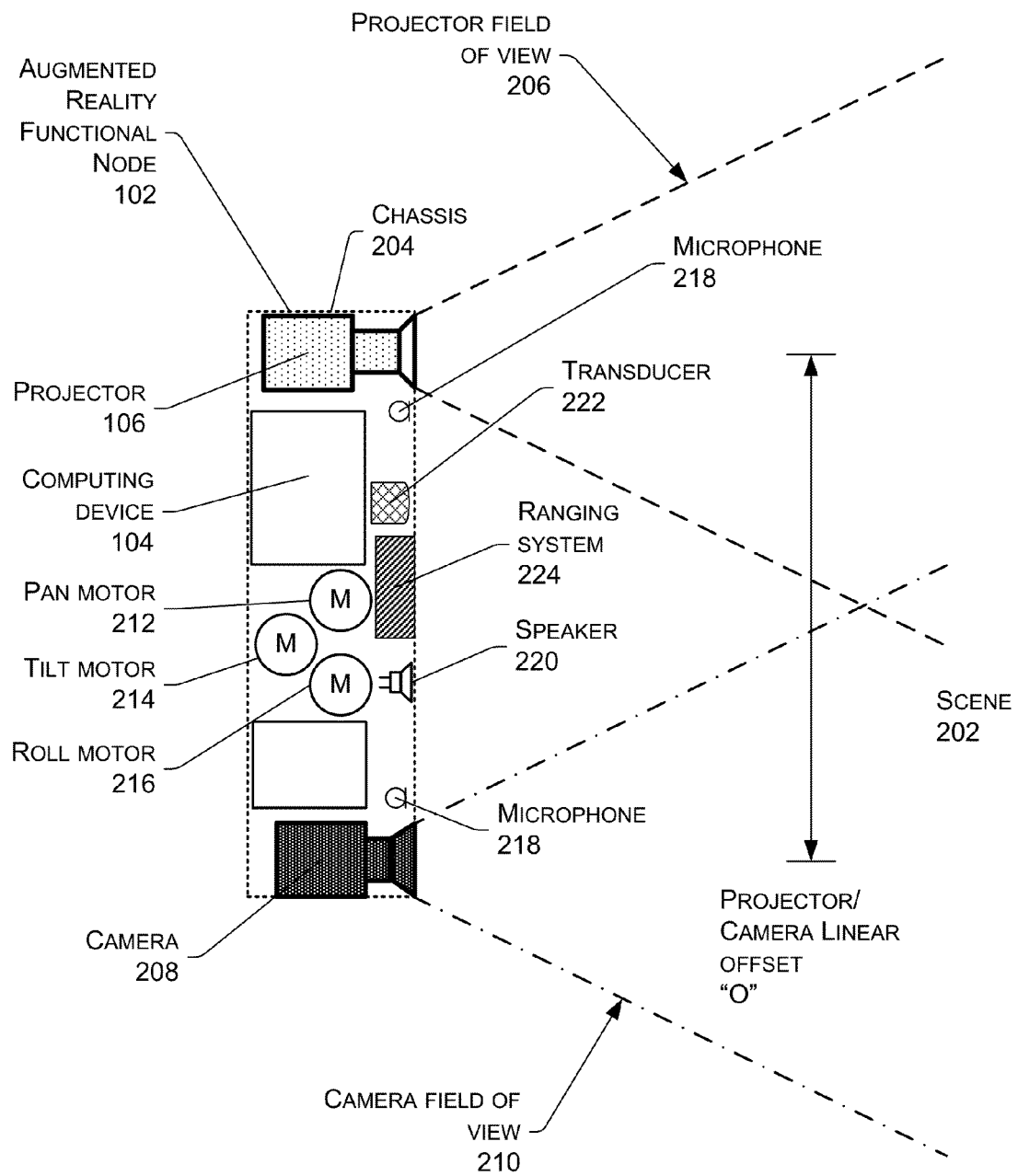
FIG. 2 illustrates an example ARFN that includes a computing device, a projector, a camera, and other selected components for allowing a user to interact with the ARFN with the use of gestures interpreted by the ARFN.

The input/output interface 126, meanwhile, may be configured to couple the computing device 104 to other components of the ARFN 102, such as the projector 106, the sensor 110, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106, the sensor 110, or both. Therefore, it is to be appreciated that the illustration of the ARFN 102 of both FIGS. 1 and 2 is for illustrative purposes only, and that components of the ARFN 102 may be configured in any other combination and at any other location.

The computer-readable media 128, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 118 may reside within a housing of the ARFN 102, on one or more storage devices accessible on a local network, on cloud storage accessible via a wide area network, or in any other accessible location.

The computer-readable media 128 may store several modules, such as instructions, datastores, and so forth that are configured to execute on the processors 124. For instance, the computer-readable media 128 may store an operating system module 130, an interface module 132, a projection module 134, a data capture module 136, a content datastore 138, a system parameters datastore 140, and an object information datastore 142.

The operating system module 130 may be configured to manage hardware and services within and coupled to the computing device 104 for the benefit of other modules. The interface module 132, meanwhile, may be configured to receive and interpret commands received from users within the environment 100. For instance, the interface module 132 may analyze and parse images captured by the sensor 110 to identify one or more hands in the environment 100. In response to recognizing a hand and identifying a gesture formed by the hand, the interface module 132 may interpret the gesture and cause the ARFN 102 to perform a corresponding action. For instance, if the user 108 within the environment 100 makes a gesture requesting that the ARFN 102 project a certain piece of content, the interface module 132 may interpret the gesture and cause the projection module 134 to project the content via the projector 106.

The data capture module 136 may obtain information about the environment 100 via the sensors 110. For example, the data capture module 136 may provide signals to one or more of the sensors 110 to obtain data from the environment 100. The data capture module 136 may also manage the storage of data obtained from images of the environment 100 in the object information datastore 142. In some cases, the data capture module 136 may store data associated with a number of particular images in the object information datastore 142 for a predetermined period of time. The data capture module 136 may also disassociate data from a particular image and store the data in association with a reference object in catalog of reference objects stored in the object information data store 142, which is described in more detail later.

In addition, the data capture module 136 may include an occluded object module 144 to estimate the missing features of portions of an object in the environment 100 that are occluded by another object in the environment 100. In one implementation, the occluded object module 144 estimates the missing features of occluded objects in the environment 100 using previously captured images of the environment 100 that include the missing features. For example, at a first time a hand of the user 108 may be touching the clipboard 118 and the arm of the user 108 may be occluding a first portion of the table 120. At a second time subsequent to the first time, the hand of the user 108 may move from the clipboard 118 to the laptop computer 116. As the hand of the user 108 moves from the clipboard 118 to the laptop computer 116, a second portion of the table 120 may be covered by the arm of the user 108. Thus, the second portion of the table 120 may not be detectable by the ARFNs 102 and the features of the second portion of the table 120 may be unknown based on images of the environment 100 captured at the second time. To estimate the features of the second portion of table 120 that is occluded by the arm of the user 108 at the second time, the occluded object module 144 may utilize one or more images of the environment 100 from the first time when the second portion of the table 120 was not occluded by the arm of the user 108.

The content datastore 138, meanwhile, stores content to be output within the environment 100. For instance, the content datastore 138 may store applications and data for use within the environment 100. The projection module 134 may access the content datastore 138 in order to project requested content within the environment 100. For instance, when a user requests that the ARFN 102 project a particular electronic book, the projection module 134 may access the content datastore 138 to retrieve and cause projection of the desired electronic book.

The computer-readable media 128 may also store the system parameters datastore 140, which is configured to maintain information about the state of the computing device 104, the projector 106, the sensor 110, and so forth. For example, and as described in detail below, the ARFN 102 may be configured to pan and tilt for the purpose of allowing the projector 106 and the sensor 110 to access different projection surfaces in the environment 100. As such, the system parameters maintained in the system parameters datastore 140 may include current pan and tilt settings of the projector 106 and the sensor 110, an indication of content that the ARFN 102 is currently projecting or otherwise outputting, and the like.

The system parameters datastore 140 (or another datastore) may further store a library of reference gestures that may be used to interpret user gestures. As illustrated, the user 108 in the environment 100 may make gestures with his body, such as hand motions, that can be captured by the sensors 110. The computing device 104 may identify motion parameters corresponding to the observed gesture and compare the observed motion parameters to those of the library of reference gestures. The computing device 104 may then classify the observed gesture based on the comparison.

In a particular implementation, in addition to images of the environment 100 and data derived from those images, the object information datastore 142 may store a catalog of reference objects that may be used to identify objects within the environment 100. For example, the object information datastore 142 may store images of particular objects that may be included in the environment 100. The object information data store 142 may also store contours, dimensions, shapes, textures, colors, combinations thereof, and the like for objects that may be included in the environment 100. The catalog of reference objects may be generated by analyzing images of the environment 100 obtained over time. For example, as the data capture module 136 obtains data about the environment 100, the data capture module 136 may associate particular data with a corresponding object in the environment 100. To illustrate, a number of images captured by the sensors 110 may include a recurring object having particular dimensions, particular colors, particular textures, a particular shape, particular contours, a particular position within the environment 100, combinations thereof, and the like. The data capture module 136 may assign an identifier to the recurring object and store the identifier in the catalog of reference objects along with data gathered about the object.

In some cases, the object data stored in the object information datastore 142 and included in the catalog of reference objects may also be obtained from sources other than images of the environment 100. For example, at least a portion of the information included in the catalog of reference objects may be obtained from one or more websites, from one or more databases remote to the environment 100, or both. In another example, at least a portion of the information included in the catalog of reference objects may be entered manually, such as via the user 108, an administrator of the computing device 104, or both.

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface, such as a display object, within the scene 202. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector 106. For example, the projector field of view 206 may narrow upon application of an optical zoom to the projector 106.

One or more cameras 208 may also be disposed within the chassis 204. The camera 208 is configured to image the scene in visible light wavelengths, non-visible light wavelengths, or both. The camera 208 has a camera field of view 210 that describes a particular solid angle. The camera field of view 210 may vary according to changes in the configuration of the camera 208. For example, an optical zoom of the camera 208 may narrow the camera field of view 210.

In some implementations, a plurality of cameras 208 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color and/or texture within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 208. For example, in one implementation the actuator may comprise a pan motor 212, a tilt motor 214, a roll motor 216, and so forth. The pan motor 212 is configured to rotate the chassis 204 in a yawing motion. The tilt motor 214, meanwhile, is configured to change the pitch of the chassis 204. The roll motor 216 is configured to move the chassis 204 in a rolling motion. By panning, tilting, and/or rolling the chassis 204, different views of the scene 202 may be acquired.

One or more microphones 218 may be disposed within the chassis 204, or elsewhere within the scene 202. These microphones 218 may be used to acquire input from a user in the scene 202, may be used to determine the location of a sound, or may be used to otherwise aid in the characterization of and receipt of input from the scene 202. For example, the user may make a particular noise, such as a tap on a wall or a snap of the fingers, which are pre-designated as attention command inputs. The user may alternatively use voice commands. Such audio inputs may be located within the scene 202 using time-of-arrival differences among the microphones 218 and used to summon an active zone within the scene 202.

One or more speakers 220 may also be present to provide for audible output. For example, the speakers 220 may be used to provide output from a text-to-speech module or to playback pre-recorded audio.

A transducer 222 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 224. The ranging system 224 is configured to provide distance information from the ARFN 102 to a scanned object or a set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

FIG. 2 also illustrates a projector/camera linear offset designated as "O". This is a linear distance between the projector 106 and the camera 208. Placement of the projector 106 and the camera 208 at a distance "O" from one another may aid in the recovery of 3D structured light data from the scene 202. The known projector/camera linear offset "O" may also be used to calculate distances, dimensioning, and otherwise aid in the characterization of objects within the scene 202. In other implementations the relative angle and size of the projector field of view 206 and camera field of view 210 may vary. Also, the angle of the projector 106 and the camera 208 relative to the chassis 204 may vary.

In other implementations, the components of the ARFN 102 may be distributed in one or more locations within the scene 202. As mentioned above, microphones 218 and speakers 220 may be distributed throughout the environment that includes the ARFN 102. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
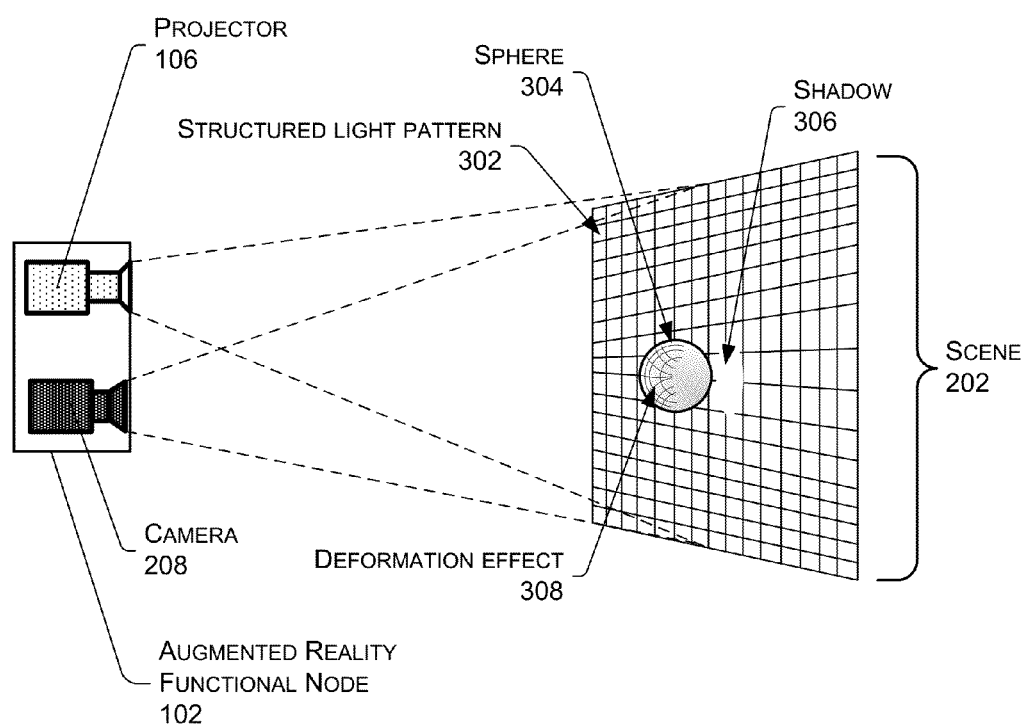
FIG. 3 is an illustrative diagram of the ARFN using structured light to identify surfaces, objects, and user interactions within an environment.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 208 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to a user within the scene 202, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene 202. These may include different PN patterns, geometric shapes, and so forth.

For illustrative purposes in FIG. 3, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene 202. Where the projector 106 and camera 208 have differing fields of view, such as shown in FIG. 2, the dispersion or change in the "density" of the structured light pattern 302 may be used to determine depth of field.

The camera 208 may detect the interaction of the structured light pattern 302 with objects within the scene 202. For example, the deformation effect 308 on the sphere 304 may be detected by the camera 208. The camera 208 may similarly identify deformation effects on users within the scene 202 and may utilize this information to identify user gestures and trajectories of these gestures. That is, the camera 208 may identify, via deformation in the structured light, a location of a selection tool (e.g., a user's finger) as this location changes over time. The ARFN 102 may then use these locations tracked over time to identify a trajectory of the gesture.

Described below are techniques of using a projection and imaging system (e.g., an ARFN 102) to estimate the missing features of portions of occluded objects. In a particular implementation, the missing features of the occluded objects may be estimated when modeling an environment, such as a workspace. The various processes described below with reference to FIGS. 4, 8 and 9 may be implemented by the architectures described herein, or by other architectures. Each process is illustrated as a collection of blocks in a logical flow graph. Some of the blocks represent operations that can be implemented in hardware, software, or a combination thereof. In an illustrative example, the operations may be implemented via one or more of the modules 130, 132, 134, 136, and 144 of the ARFN 102 of FIG. 1. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 4:
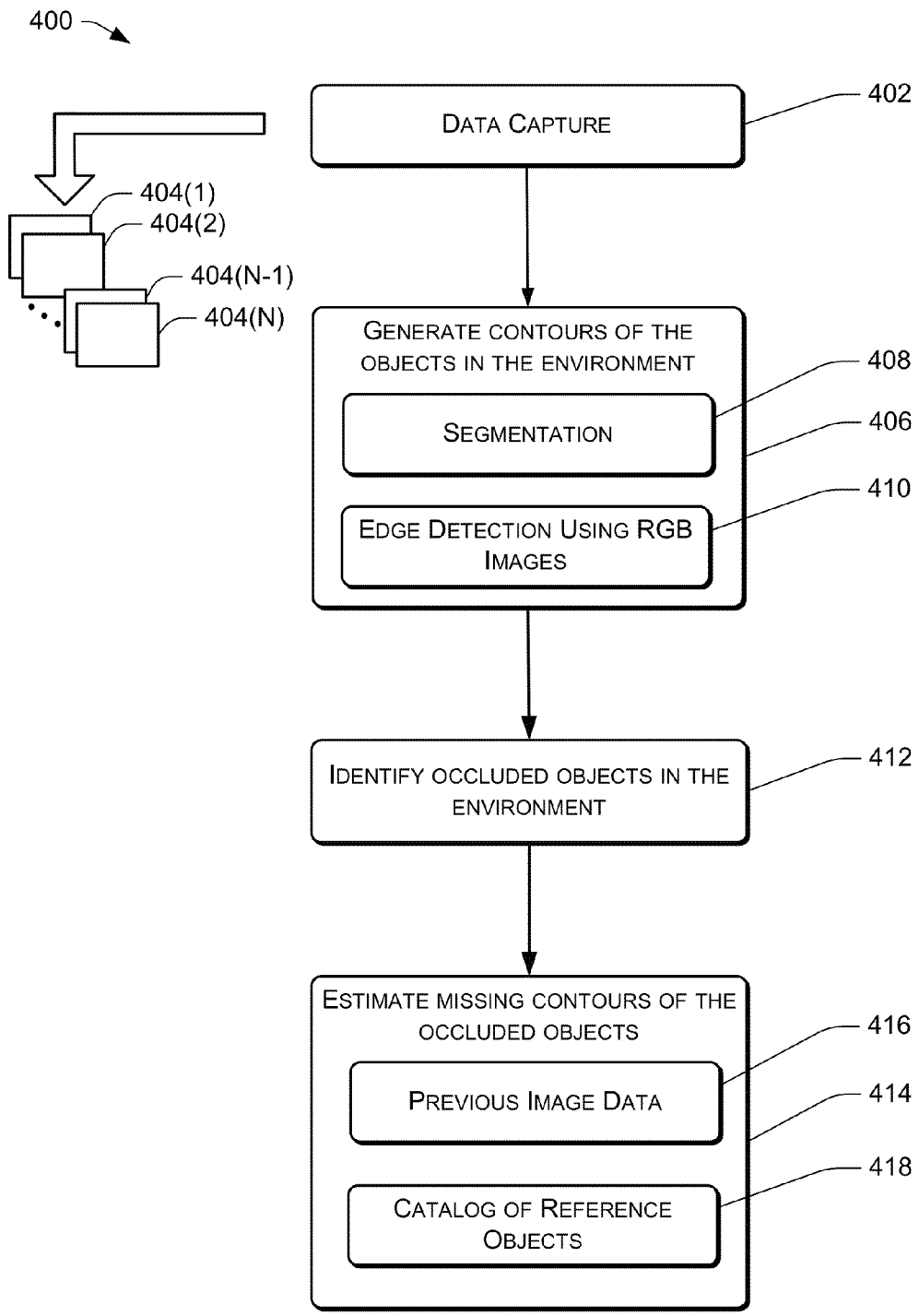
FIG. 4 illustrates an example flow diagram of a process to estimate missing features of occluded objects in an environment according to one implementation.

FIG. 4 illustrates an example flow diagram of a process 400 to estimate features of portions of occluded objects in an environment according to one implementation. By estimating the missing features of occluded objects, a more complete model of an environment, such as the environment 100, can be generated. In particular, a more complete model of the environment 100 can be generated when objects are in motion within the environment 100. The process 400 will be described as being performed in the environment 100 described above with reference to FIGS. 1-3. However, the process 400 may be performed in other environments, using other means of image capture and/or scene analysis.

At 402, data is captured by one or more of the sensors 110 of the ARFNs 102. For example, a plurality of images 404(1), 404(2) . . . 404(N−1), 404(N) of a scene 202 within the environment 100 may be obtained via the cameras 208. In one implementation, the images 404(1), 404(2) . . . 404(N−1), 404(N) may include a series of 3D images captured over time. To illustrate, the image 404(1) may be captured at an initial time with images 404(2) . . . 404(N−1), 404(N) being captured at successively later times, with the image 404(N) being the most recent image captured. In some cases, at least a portion of the images 404(1), 404(2) . . . 404(N−1), 404(N) may be captured at regular time intervals, while in other instances at least a portion the images 404(1), 404(2) . . . 404(N−1), 404(N) may be captured at irregular intervals. In particular implementations, the time intervals between capturing the images 404(1), 404(2) . . . 404(N−1), 404(N) may be on the order of hours, on the order of minutes, on the order of seconds, on the order of fractions of seconds, or a combination thereof. In some scenarios, the time interval between capturing images may be based, at least in part, on the speed of objects moving through the environment 100. In one example, the time interval between capturing images 404(1), 404(2) . . . 404(N−1), 404(N) may increase as the speed of one or more objects moving through the environment 100 increases, while in another example, the time interval between capturing images 404(1), 404(2) . . . 404(N−1), 404(N) may decrease when the speed of one or more objects moving through the environment 100 decreases.

The images 404(1), 404(2) . . . 404(N−1), 404(N) may include 3D images, 2D images, or both. In particular situations, the 2D images captured by the one or more sensors 108 may correspond to respective 3D images captured by the one or more sensors 108. The images 404(1), 404(2) . . . 404(N−1), 404(N) may also include images captured by an RGB camera. Additionally, the images 404(1), 404(2) . . . 404(N−1), 404(N) may be captured by the sensors 108 by detecting the interaction between the structured light pattern 302 and one or more objects within the scene 202, such as one or more hands of the user 108.

At 406, features of objects in the environment 100 may be generated from data obtained from the images 404(1), 404(2) . . . 404(N−1), 404(N). For example, contours, dimensions, colors, textures, shapes, positions, combinations thereof, and the like of objects in the environment 100 may be determined from data obtained from the images 404(1) 404 (2) . . . 404(N−1), 404(N). In a particular implementation, contours of objects in the environment 100 may be determined by segmenting surfaces within the environment 100 to identify different continuous surfaces of 3D images of the environment 100. In some instances, the segmentation of the 3D images of the environment 100 may produce 3D data sets corresponding to each respective continuous surface. In an illustrative implementation, continuous surfaces within the environment 100 may be identified by determining distances between particular points in the environment 100 and the sensor 110. When the difference between respective distances between two points within the environment 100 and the sensor 110 is less than or equal to a threshold distance, the two points are designated as being part of the same continuous surface.

In a particular implementation, 3D boundaries of the continuous surfaces may then be determined. The 3D boundaries of the continuous surfaces may include 3D points located on the outermost edges or the periphery of the continuous surfaces in the environment 100. Subsequently, 2-dimensional (2D) contours of the continuous surfaces may be generated from the 3D boundaries. In some cases, the contours of particular objects included in the 3D images of the environment 100 may be determined, such as the contours of one or more objects located in the workspace 122 within the environment 100.

Additionally features of objects in the environment 100 may be determined according to images of the environment 100 obtained by one or more RGB cameras. In one implementation, contours of objects in the environment 100 may be generated from RGB camera data by identifying regions having different colors, regions having different textures, or both. For example, at least a portion of the contours of the laptop computer 116 may be determined using RGB images of the environment 100 due to differences in color and/or texture between the laptop computer 116 and the table 120. Colors and textures of objects in the environment 100 may also be determined from RGB images of the environment 100.

In an implementation, one or more of the images 404(1), 404(2) . . . 404(N−1), 404(N) may include objects having missing features, which may include in some cases missing contours, missing colors, and missing textures. For example, portions of one object in the environment 100 may be occluded by another object in the environment 100. In some cases, a portion of an object may be occluded by an object in motion within the environment 100, such as a hand of the user 108 moving over the edge of the table 120. In other cases, a portion of an object may be occluded by a stationary object, such as the clipboard 118 resting on the edge of the table 120.

Accordingly, the process 400 may include, at 408, identifying occluded objects in an image of the environment 100. In a particular implementation, the occluded objects may be identified by comparing the features of objects in an image of the environment 100 with data including features of objects stored in the object information datastore 142. For example, the occluded object module 144 may compare the features of an object representing the table 120 in the image 404(N) with features of objects stored in the object information data store 142. In some cases, the features of objects stored in the object information data store 142 may be obtained from the images 404(1), 404(2) . . . 404(N−1). Based on the comparison, the occluded object module 144 may determine that the features of the table 120 in the image are incomplete and identify the table 120 as an occluded object in the image 404(N).

In some cases, occluded objects in the environment 100 may be identified based on missing colors of objects in the environment 100, missing textures of objects in the environment 100, missing contours of objects in the environment 100, or a combination thereof. Further, occluded objects in the environment 100 may be identified based on contrasts between colors and/or textures of objects in the environment 100, based on changes to colors and/or textures of particular locations in the environment 100 over time, or a combination thereof. For example, when a portion of the laptop computer 116 is occluded by a hand of the user 108, the occluded portion of the laptop computer 116 may have a different color and/or texture than scenarios when the laptop computer 116 is not occluded by the hand of the user 108. Since the features of portions of an object in the environment 100 may be occluded by another object, the process 400 may include, at 410, estimating the missing features of the occluded object. In some cases, the occluded object module 144 may utilize data stored in the object information datastore 142 to estimate the missing features of occluded objects.

In one illustrative implementation, the process 400 includes, at 412, estimating the features of an object in an image that are occluded by another object in the environment 100 based on features of the object in previously captured images. For example, when an object in an image captured at a particular time is identified as an occluded object, the features of objects in one or more previously captured images may be compared with the features of the occluded object. When a threshold amount of the features of an object in the one or more previously captured images match the features of non-occluded portions of the occluded object, the missing features of the occluded object may be estimated based on the features of the object from the previously captured images. To illustrate, a portion of the table 120 in the image 404(N) may be occluded by another object in the environment 100. The occluded object module 144 may analyze the features of the portion of the table 120 in one or more of the previously captured images 404(1), 404(2) . . . 404(N−1) to identify the missing features of the table 120 in the image 404(N). In one example, the occluded object module 144 may determine the positions of the missing features of the table 120 in the image 404(N) and identify the features of the table 120 at the corresponding positions in one or more of the images 404(1), 404(2), . . . 404(N−1) to estimate the missing features of the table 120 in the image 404(N). In one implementation, when at least 50%, at least 70%, at least 85%, at least 95%, or at least 99% of the features of the non-occluded portions of the occluded object match the features of an object in one or more previously captured images, the missing features of the occluded object may be estimated based on the features of the object in the previously captured image. This process will be described in more detail with regard to FIGS. 5-7.

In another illustrative implementation, the occluded object module 144 may utilize additional data to estimate missing features of portions of occluded objects in the environment 100. In one example, a location of an occluded object in the environment 100 may be used to estimate missing features of the occluded object. To illustrate, when a portion of the clipboard 118 is occluded in the image 404(N), the occluded object module 144 may determine a location of the clipboard 118 in the image 404(N). The occluded object module 144 may then identify objects within a same position or a similar position in one or more of the previously captured images 404(1), 404(2), . . . 404(N−1) and utilize features of those objects to estimate the missing features of the clipboard 118 in the image 404(N). In another example, dimensions of occluded objects, the shape of occluded objects, contours of occluded objects, or a combination thereof may be utilized along with other features of the non-occluded portions of the occluded object to estimate the missing features of the occluded object. In an illustration, when a portion on one side of the clipboard 118 is occluded by another object in the image 404(N), the occluded object module 144 may extrapolate the missing features based on the dimensions, shape, color, texture, or a combination thereof of the clipboard 118 on the opposing side of the clipboard 118.

In a further illustrative implementation, missing features of occluded objects may be estimated, at 414, by utilizing data included in a catalog of reference objects stored in the object information datastore 142. In some cases, the occluded object module 144 may determine whether the catalog of reference objects includes a reference object that corresponds to the occluded object. In particular, the occluded object module 144 may compare data associated with an occluded object in the image 404(N) with data of objects stored in the catalog of reference objects. When a threshold amount of the data of the occluded object matches data of a corresponding object in the catalog of reference objects, the occluded object module 144 may utilize the data of the corresponding reference object to estimate the missing features of the occluded object. In an illustrative example, a portion of the table 120 may be occluded in the image 404(N) and the occluded object module 144 may compare the data associated with the non-occluded portions of the table 120 in the image 404(N) with data associated with reference objects in the catalog of reference objects stored in the object information datastore 142. The occluded object module 144 may then identify a particular reference object in the catalog of reference objects that corresponds to the table 120 and utilize the features of the particular reference object to estimate the missing features of the table 120 in the image 404(N). This process will be described in more detail with respect to FIG. 8

In some situations when a portion of an object within the environment 100 is occluded by another object in the environment 100 that is in motion, the missing features of the occluded object may be estimated based on data obtained from previous images of the object. An object may be considered to be in motion in the environment 100 when a position of the object changes by a predetermined distance in a specified period of time or over a specified number of images in a series of images. Additionally, an object in motion in the environment 100 may occlude different portions of the occluded object as the object moves through the environment 100.

In one illustrative example, a hand of the user 108 may move across the table 120 and occlude different portions of the table 120 as the hand moves. Thus, images of the environment 100 captured at different times may indicate that different portions of the table 120 are occluded depending on the position of the hand in a particular image. To illustrate, the hand of the user 108 may occlude a first portion of the table 120 in the image 404(N−1) and a second portion of the table 120 in the image 404(N). In some cases, at least a portion of the second portion of the table 120 that is occluded by the hand of the user 108 in the image 404(N) is not included in the first portion of the table 120 occluded by the hand of the user 108 in the image 404(N−1). Accordingly, the occluded object module 144 may determine that the object occluding the table 120 (i.e., the hand of the user 108) is in motion and utilize at least the non-occluded portions of the table 120 in the image 404 (N−1) to estimate the features of the table 120 that were occluded in the image 404(N).

In other instances, when previous images including missing features of an object are unavailable or an object in the environment 100 is occluded by an object that has remained stationary, the missing features of an occluded object may be estimated based on information included in the catalog of reference objects stored in the object information datastore 142. In some cases, an object may be considered stationary when the position of the object has remained substantially the same for a predetermined period of time. In one implementation, the predetermined period of time may include a particular number of minutes or a particular number of seconds. In other cases, an object may be considered stationary when the position of the object has remained substantially the same in a threshold number of previously captured images.

In an illustrative example, the clipboard 118 may cover a particular portion of the table 120 for an amount of time greater than the threshold period of time. Thus, the clipboard 118 may cover the same or similar portion of the table 120 in a number of the images 404(1), 404(2) . . . 404(N−1), 404(N). In this scenario, the occluded object module 144 may compare the features of the non-occluded portions of the table 120 and other data associated with the table 120 in these images with data included in the catalog of reference objects. When the occluded object module 144 identifies a reference object having data that matches a threshold amount of the data associated with the table 120, the occluded object module 144 may utilize information about the table 120 in the catalog of reference objects to estimate the missing features of the table 120.

Figure 5:
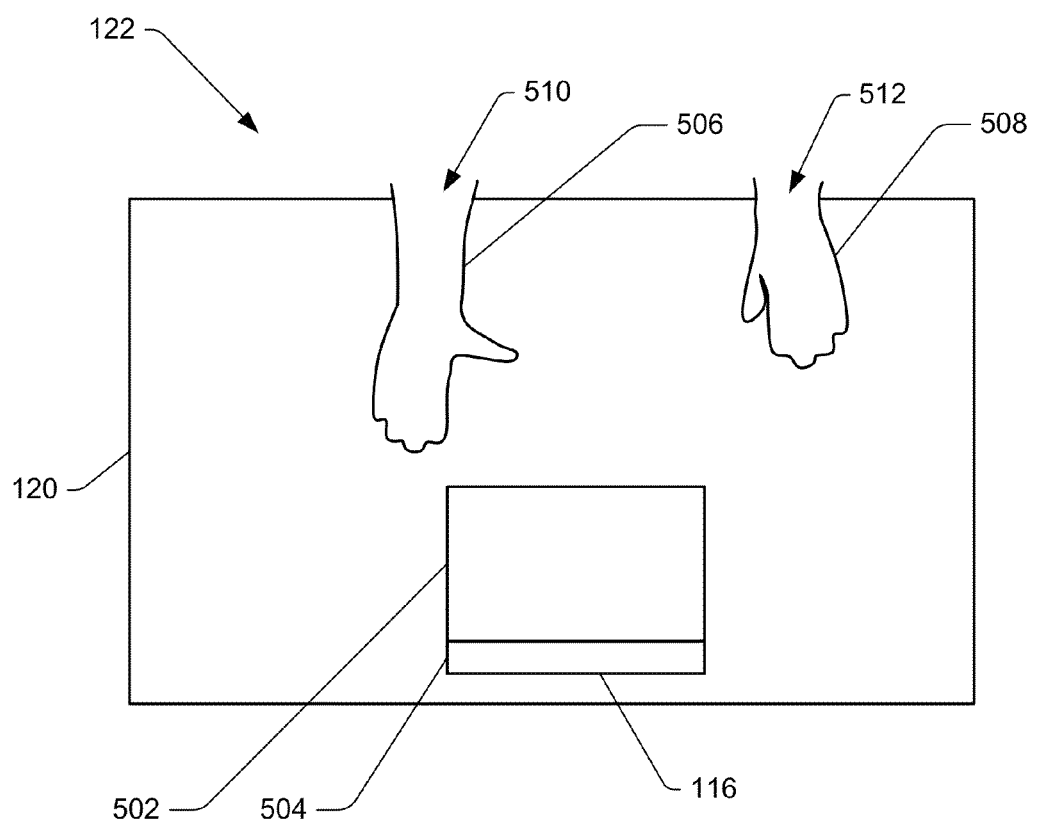
FIG. 5 illustrates features of objects in the workspace generated from a first image of the environment obtained at a first time.

FIG. 5 illustrates features of objects in the workspace 122 generated from a first image of the environment 100 obtained at a first time. The workspace 122 includes the table 120 and the laptop computer 116. In the illustrative example of FIG. 5, the laptop 116 is open and the contours of the laptop 116 include a keyboard portion 502 and a display portion 504. The workspace 122 also includes a first hand 506 and a second hand 508. The first hand 506 and the second hand 508 may be hands of a user, such as the user 108, that are interacting with objects in the workspace 122. In some cases, at least a portion of the first hand 506, the second hand 508, or both are in contact with the surface of the table 120. In other cases, at least a portion of the first hand 506, the second hand 508, or both are removed from the surface of the table 120. The first hand 506 occludes a first portion 510 of the table 120 and the second hand 508 occludes a second portion 512 of the table 120. Thus, the contours and other features of the first portion 510 and the second portion 512 of the table 120 are not shown in FIG. 5. In some cases, the first portion 510 and the second portion 512 are not shown in FIG. 5 because the first hand 506 is obstructing the ARFNs 102 from obtaining data regarding the first portion 510 and the second hand 508 is obstructing the ARFNs 102 from obtaining data regarding the second portion 512.

Figure 6:
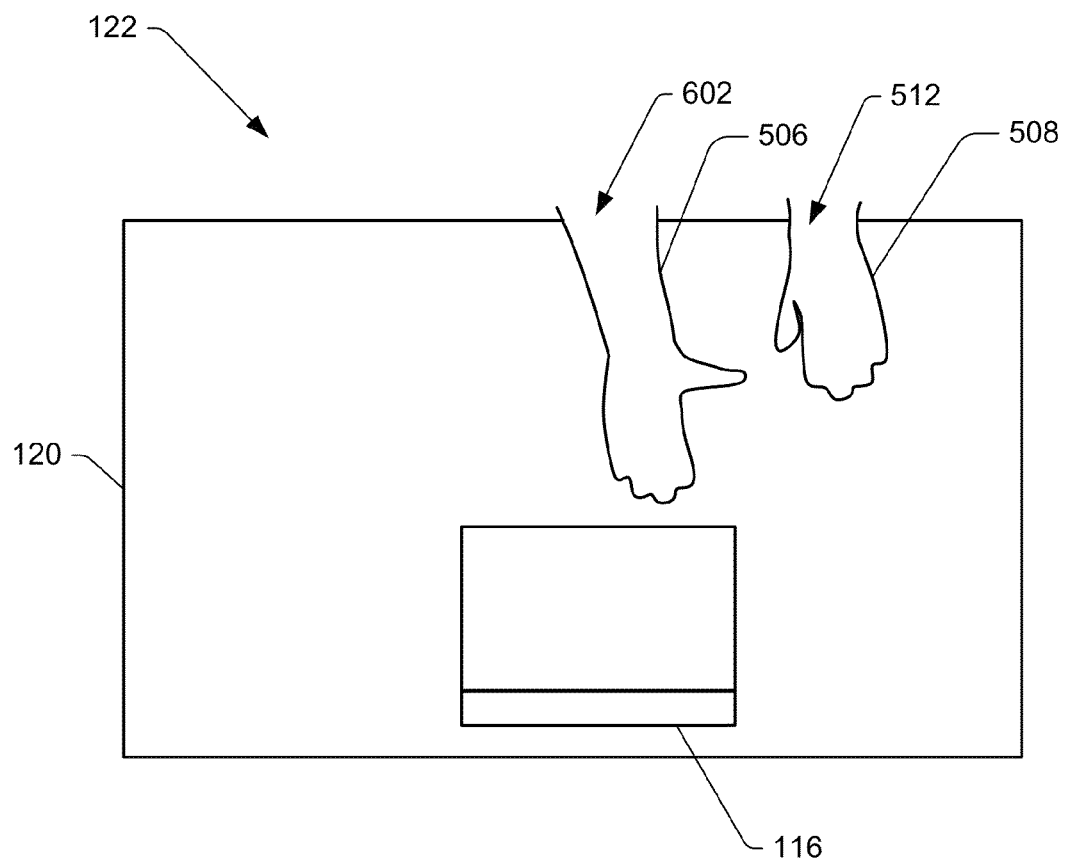
FIG. 6 illustrates features of objects in the workspace generated from a second image of the environment obtained at a second time subsequent to the first time shown in FIG. 5.

FIG. 6 illustrates features of objects in the workspace 122 generated from a second image of the environment 100 obtained at a second time subsequent to the first time. The workspace 122 includes the table 120 and the laptop computer 116. The workspace 122 also includes the first hand 506 and the second hand 508. In the illustrative example of FIG. 6, a position of the first hand 506 has changed with respect to the position of the first hand 506 in FIG. 5. In one example, the position of the first hand 506 may have changed from FIG. 5 to FIG. 6 because the user 108 is moving the first hand 506 to interact with a different portion of the workspace 122. Thus, the first hand 506 occludes a third portion 602 of the table 120 that is different from the first portion 510 of the table 120 occluded by the first hand 506 in FIG. 5. Additionally, a position of the second hand 508 in the illustrative example of FIG. 6 is substantially the same as the position of the second hand 508 in FIG. 5. In an example, the user 108 may be resting the second hand 508 on the surface of the table 120 at the first time of FIG. 5 and the second time of FIG. 6. Accordingly, the second hand 508 may continue to occlude the second portion 512 of the table 120 in FIG. 6.

Figure 7:
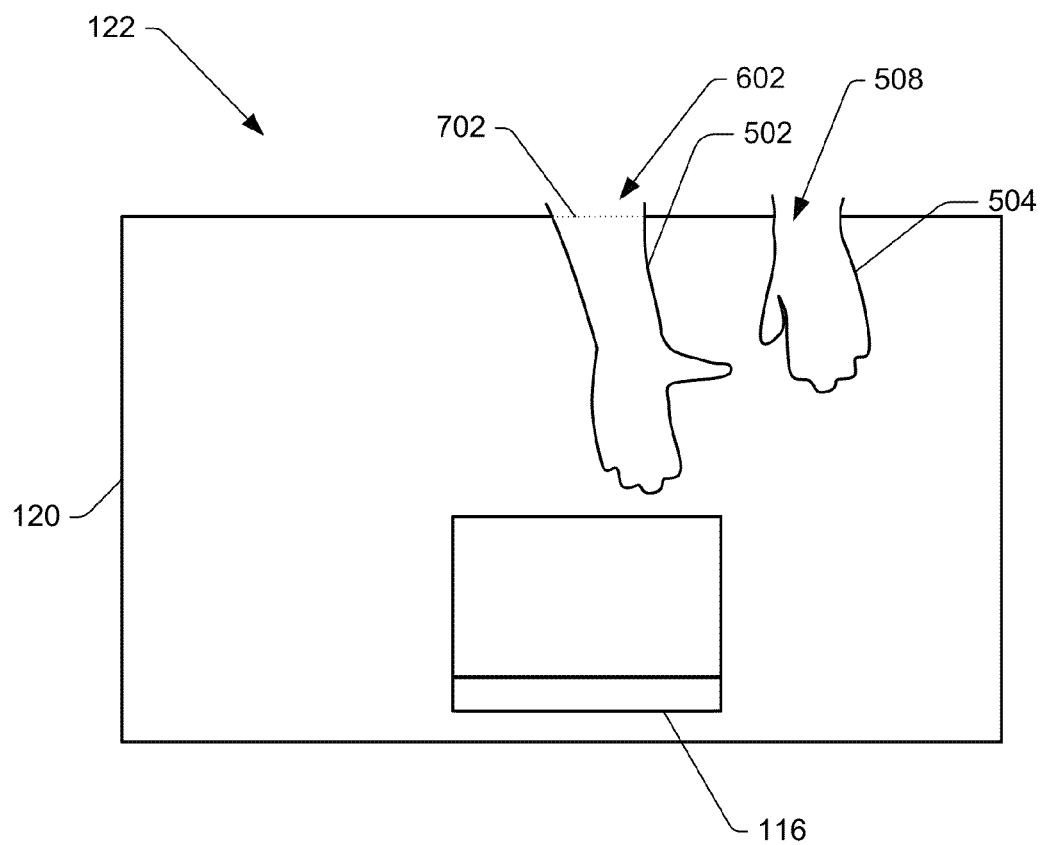
FIG. 7 illustrates features of objects in the workspace generated from the second image along with estimated features for an occluded portion of an object in the workspace.

FIG. 7 illustrates features of objects in the workspace 122 generated from the second image along with estimated features for an occluded object in the workspace 122. The workspace 122 includes the table 120, the laptop computer 116, the first hand 506, and the second hand 508. In the illustrative example of FIG. 7, contours 702 of the third portion 602 of the periphery of the table 120 are estimated. In some cases, the contours 702 may be estimated using information from one or more previously captured images. In other cases, the contours 702 may be estimated from information stored in a catalog of reference objects. In an illustrative implementation, information from the first image used to generate the features of FIG. 5 may be used to estimate the contours 702. For example, in FIG. 5, the contours of the third portion 602 are not occluded by the first hand 506. Thus, the missing contours of the third position 602 in FIG. 7 may be estimated using contours of non-occluded portions of the periphery of the table 120 at the same position from FIG. 5. In one implementation, the contours 702 may be estimated by superimposing the contours of the table 120 from FIG. 5 over the contours of the table 120 from FIG. 6.

Additional features of the third portion 602 of the table 120 that are occluded by the hand 502 may also be estimated from the first image used to generate the features of FIG. 5. For example, textures and/or colors of the table 120 at portion 704 may be estimated using textures and/or colors of the table 120 at a corresponding position obtained from the first image used to generate the features of FIG. 5.

Figure 8:
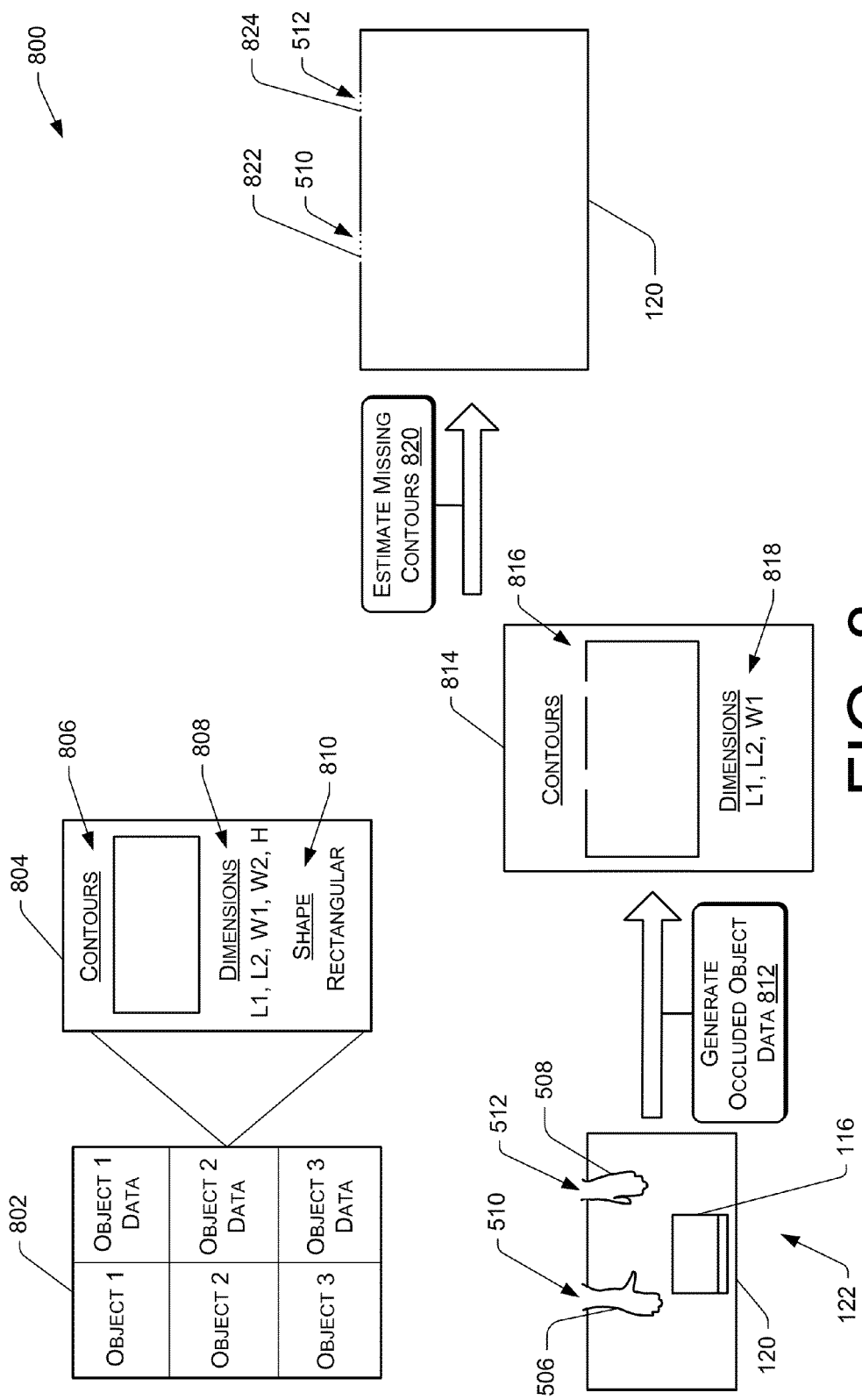
FIG. 8 illustrates a process to estimate features of an occluded object using information stored in a catalog of reference objects according to one implementation.

FIG. 8 illustrates a process 800 to estimate features of an occluded object using information stored in a catalog of reference objects 802. The catalog of reference objects 802 may include information about one or more objects located in an environment, such as the environment 100, and may be stored in a particular datastore, such as the object information datastore 142. In the illustrative example of FIG. 8, the catalog of reference objects 802 includes three reference objects, Object 1, Object 2, and Object 3 and data corresponding to each of the reference objects, Object 1 Data, Object 2 Data, and Object 3 Data. In a particular case, the Object 2 Data 804 is shown in more detail and includes contours 806 of Object 2, dimensions 808 of Object 2, and a shape 810 of Object 2.

In the illustrative example of FIG. 8, the table 120 may be identified as an occluded object because the first hand 506 and the second hand 508 occlude respective portions 510, 512 of the table 120. At 812, the process 800 includes generating occluded object data 814 relating to the occluded object (i.e., the table 120). For example, the occluded object data 814 may include features of the occluded object, such as the contours 816 of the non-occluded portions of the periphery of the table 120 and dimensions 818 of the table 120. The dimensions 818 may include measurements that can be calculated from information about the sides of the table 120 that are not occluded by other objects in the workspace 122.

At 820, the process 800 includes estimating the missing features of the table 120 using data from the catalog of reference objects 802. In some cases, the occluded object data 816 may be compared with data included in the catalog of reference objects 802 to identify a reference object in the catalog of reference objects 802 that corresponds to the occluded object. For example, the contours 816 and the dimensions 818 may be compared with the Object 1 Data, the Object 2 Data, and/or the Object 3 Data. In particular, the contours 816 and the dimensions 818 may be compared with the respective contours and dimensions of Object 1, Object 2, and Object 3. In other situations, a location of the occluded object, a texture of the occluded object, a color of the occluded object, a shape of the occluded object, or a combination thereof, may be compared to the corresponding features of reference objects included in the catalog of reference objects 802 to identify a reference object that corresponds to the occluded object.

When a threshold amount of the occluded object data 814 matches data from an object in the catalog of reference objects 802, the table 120 may be associated with the corresponding object in the catalog of reference objects 802. In the illustrative example of FIG. 8, the occluded object data 814 most closely matches the Object 2 Data. Thus, the table 120 is identified as Object 2 in the catalog of reference objects 802. Accordingly, the missing features of the table 120 at the first portion 510 and the second portion 512 may be estimated using the Object 2 Data 804. To illustrate, the contours 806, the dimensions 808, the shape 810, or a combination thereof, of the Object 2 Data 804 may be used to generate first contours 822 of the first portion 510 and second contours 824 of the second portion 512 for the table 120.

Figure 9:
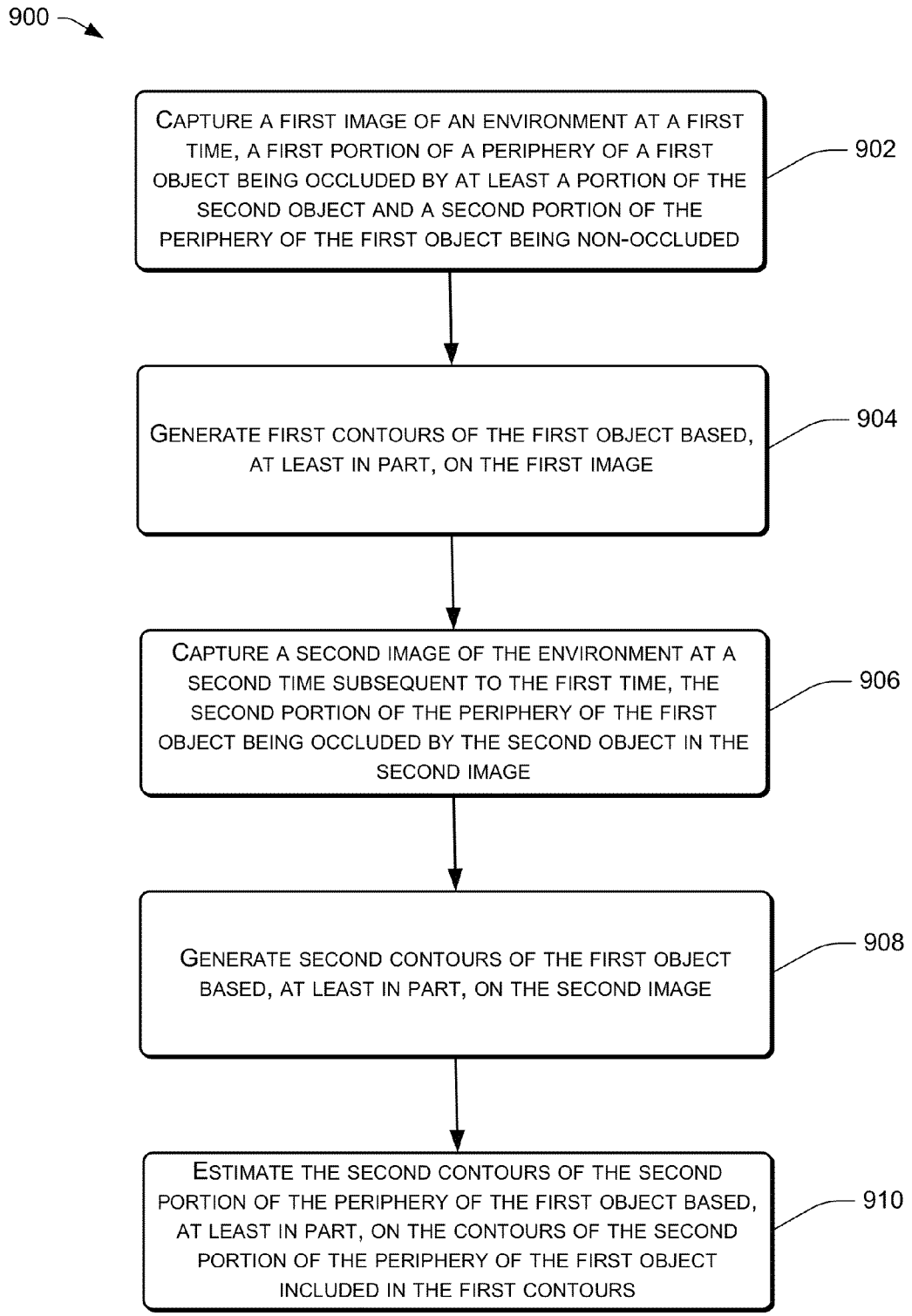
FIG. 9 shows an example flow diagram of a process to estimate the missing features of an occluded object according to another implementation.

FIG. 9 shows an example flow diagram of a process 900 to estimate missing features of an occluded object according to another implementation. The process 900 will be described as being performed in the environment 100 described previously herein, but may be performed in other environments, using other means of image capture and/or scene analysis.

At 902, the process 900 capturing a first image of an environment at a first time. The first image may indicate that a first portion of a first object is occluded by at least a portion of a second object and a second portion of the first object is at least partially non-occluded. For example, a hand of the user 108 may occlude a first portion of the table 120, such as the hand 506 occluding the first portion 510 of the table 120 in FIG. 5, while other portions of the table 120 are not occluded by any object. In some implementations, the first portion of the first object may be occluded by a plurality of objects. Additionally, in some situations, at least a portion of the second object may be in direct contact with the first portion of the first object, while in other cases the second object may be removed from the first portion of the first object.

At 904, the process 900 includes generating features of the first object and features of the second object based, at least in part, on the first image. Since a portion of the position of the second object occludes the first portion of the first object, features of the first portion of the first object may be absent. In particular, the ARFNs 102 may be unable to generate the features of the first portion of the first object because the first portion of the first object is blocked from the field of view of one or more sensors of the ARFNs 102 by the second object.

At 906, the process 900 includes capturing a second image of the environment at a second time subsequent to the first time. In a particular implementation, the first time is within a range of 0.1 seconds to 5 seconds of the second time. In the second image, the second portion of the first object is occluded by the second object. Additionally, in some cases, the second object directly contacts the second portion of the first object at the second time, while in other scenarios, the second object is removed from the second portion of the first object.

At 908, the process 900 includes generating features of the first object and the second object based, at least in part, on the second image. Since a portion of the second object occludes the second portion of the first object, features of the second portion of the first object may be absent.

In one implementation, the first image, the second image, or both may be 3D images of the environment 100 and data of the 3D images may be used to generate the features of the first object and the second object in the first image and/or the second image. Further, the features of the first object and the second object in the first image and the second image may be generated from additional images of the environment 100 captured by one or more RGB cameras. For example, features of the first object and the second object may be generated based on colors of the first object and the second object, textures of the first object and the second object, or both in the first image and/or the second image. In an illustrative implementation, the first image and the second image may include 3D images of the environment 100 and a first additional image of the environment 100 may be captured by an RGB camera substantially at the first time and a second additional image of the environment 100 may be captured by the RGB camera substantially at the second time. In this implementation, the features of the first object and the second object at the first time and the second time may be generated from the respective 3D images and RGB images of the environment 100 captured at the first time and the second time.

At 910, the process 900 includes estimating missing features of the second portion of the first object in the second image based, at least in part, on the features of the second portion of the first object generated from the first image. To illustrate, since the second portion of the first object is at least partially non-occluded in the first image, the features of the non-occluded portions of the first object generated from the first image may be used to estimate the features of the second portion of the first object that are absent from the features of the second image.

In some situations, one or more images captured previous to the first time may be used to estimate the missing features corresponding to the occluded portions of the first object in the second image. For example, the second portion of the first object may be partially occluded in the first image. Accordingly, a previous image of the environment 100 captured before the first time may indicate that the second portion of the first object is substantially non-occluded and the features of the second portion of the first object generated from the previous image may be substantially complete. Thus, any features of the second portion of the periphery of the first object generated from the first image that may be incomplete, may be estimated from the features of the second portion of the first object generated from the previous image.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more cameras to obtain a plurality of images of an environment, the environment including a first object and a second object;
   one or more non-transitory computer-readable media storing computer-executable instructions that, when executed by the one or more processors, cause the one or more processors to perform acts comprising:
      capturing a first image of the environment at a first time, wherein a first portion of the first object is occluded by at least a portion of the second object and a second portion of the first object is non-occluded;
      generating first features of the first object based, at least in part, on the first image, wherein the first features include features of the second portion of the first object and features of the first portion of the first object are absent from the first features;
      capturing a second image of the environment at a second time subsequent to the first time, wherein the second portion of the first object is occluded by the second object in the second image;
      generating second features of the first object based, at least in part, on the second image, wherein the features of the second portion of the first object are absent from the second features; and
      estimating the features of the second portion of the first object in the second image based, at least in part, on the features of the second portion of the first object included in the first features generated based on the first image.

2. The system of claim 1, wherein the first image, the second image,
   or both are 3-Dimensional (3D) images of the environment.

3. The system of claim 2, wherein the acts further comprise capturing an additional image of the environment substantially at the first time, the additional image being captured by a red-green-blue (RGB) camera.

4. The system of claim 3, wherein the generating the first features of the first object is based, at least in part, on a color of the first object in the additional image, a texture of the first object in the additional image, or a combination thereof.

5. The system of claim 1, wherein a surface of the second object contacts a surface of the first object at the first portion of the first object at the first time.

6. The system of claim 1, wherein a time interval between the first time and the second time is based, at least in part, on a speed of the second object.

7. The system of claim 1, further comprising:
   capturing a previous image before the first time, the previous image including the first object and the second portion of the first object is non-occluded in the previous image; and
   generating previous features of the first object based, at least in part, on the previous image, wherein the previous features of the first object include features of the second portion of the first object.

8. The system of claim 7, wherein the estimating the features of the second portion of the first object is based, at least in part, on the features of the second portion of the first object included in the previous features.

9. A method comprising:
   obtaining, by sensors of a computing device, data including a plurality of images of an environment;

generating, by the computing device, first features of a first object and second features of a second object included in a particular image of the plurality of images;

determining, by the computing device, that a particular portion of the first object is occluded by the second object; and estimating, by the computing device, the features of the particular portion of the first object based, at least in part, on at least one of information included in a catalog of reference objects or data from at least one image including the first object that is captured previous to the particular image in which the particular portion of the first object was non-occluded.

10. The method of claim 9, wherein the generating the first features of the first object and the second features of the second object includes:

segmenting surfaces in the environment to identify continuous surfaces in the environment; and determining 3-Dimensional (3D) points located on respective peripheries of the continuous surfaces.

11. The method of claim 9, wherein the second object is in motion in the environment during a time when the particular image is captured or the second object has remained substantially stationary in a threshold number of images captured previous to the particular image.

12. The method of claim 9, further comprising determining whether the catalog of reference objects includes a particular reference object corresponding to the first object.

13. The method of claim 12, wherein the determining whether the catalog of reference objects includes a particular reference object corresponding to the first object includes at least one of:

comparing contours of non-occluded portions of a periphery of the first object with respective contours of reference objects included in the catalog of reference objects;

comparing dimensions of the first object with respective dimensions of the reference objects included in the catalog of reference objects; or comparing a location of the first object with respective locations associated with the reference objects included in the catalog of reference objects.

14. The method of claim 9, further comprising obtaining information about reference objects in the catalog of reference objects from one or more images of the environment, input from a user of the computing device, or a combination thereof.

15. A method comprising:

obtaining, by a camera of a computing device, a particular image of a workspace included in a portion of an environment;

identifying, by the computing device, a first object in the workspace comprising a particular portion that is occluded by a second object in the workspace in the particular image; and estimating, by the computing device, missing features of the first object based, at least in part, on at least one of information corresponding to the first object included in a catalog of reference objects or data from at least one image that includes the first object that is captured previous to the particular image in which the particular portion of the first object was non-occluded.

16. The method of claim 15, wherein the workspace includes a table, a desk, a chair, a laptop computer, a desktop computer, a tablet computer, a telephone, one or more hands of a user of the workspace, office supplies, paper products, furniture, or combinations thereof.

17. The method of claim 15, wherein the first object is occluded by a hand of a user in the workspace.

18. The method of claim 15, wherein the estimating the missing features of the first object is based on the information corresponding to the first object included in the catalog of reference objects when the second object is substantially stationary for a predetermined period of time.

19. The method of claim 15, wherein the estimating the missing features of the first object is based on the data from at the least one image captured previous to the particular image when the second object covers different portions of the first object within a particular period of time.

20. One or more non-transitory computer-readable media storing computer-executable instructions that, when executed by one or more processors, cause the one or more processors to perform acts comprising:

obtaining a plurality of images of an environment, wherein each of the plurality of images includes multiple objects;

identifying a first object in an image of the plurality of images having portions of the first object being occluded by a second object;

generating data corresponding to features of the first object;

identifying, based on the data corresponding to the features, a reference object in a catalog of reference objects that corresponds to the first object; and estimating missing features of occluded portions of the first object based, at least in part, on respective features of the reference object corresponding to the missing features of the occluded portions of the first object.

21. The one or more computer-readable media of claim 20, wherein the features of the first object include a location of the first object, a dimension of the first object, a shape of the first object, a texture of the first object, a color of the first object, non-occluded contours of the first object, or a combination thereof.

22. The one or more computer-readable media of claim 20, wherein the acts further comprise identifying the reference object by comparing one or more features associated with the reference object with corresponding features of the first object.

23. The one or more computer-readable media of claim 20, wherein an additional portion of the first object is occluded by an additional object, and the acts further comprise estimating occluded features of the additional portion of the periphery of the first object based on one or more previously obtained images of the environment that include the first object.

24. The one or more computer-readable media of claim 20, wherein the portion of the first object that is occluded by the second object is blocked from a field of view of a camera obtaining the plurality of images of the environment.

* * * * *